(12) United States Patent
Taillefer et al.

(10) Patent No.: US 8,473,921 B2
(45) Date of Patent: Jun. 25, 2013

(54) DEBUGGING MECHANISMS IN A CACHE-BASED MEMORY ISOLATION SYSTEM

(75) Inventors: Martin Taillefer, Redmond, WA (US); Ali-Reza Adl-Tabatabai, San Jose, CA (US); Gad Sheaffer, Haifa (IL); Peter Lachner, Heroldstatt (DE); Richard Wurdack, Seattle, WA (US); Darek Mihocka, Bellevue, WA (US); Jan Gray, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 12/646,438

(22) Filed: Dec. 23, 2009

(65) Prior Publication Data

US 2011/0145798 A1 Jun. 16, 2011

Related U.S. Application Data

(60) Provisional application No. 61/286,755, filed on Dec. 15, 2009.

(51) Int. Cl.
*G06F 9/44* (2006.01)

(52) U.S. Cl.
USPC .............................. 717/129; 717/124; 717/127

(58) Field of Classification Search
USPC .......................................................... 717/129
See application file for complete search history.

(56) References Cited

U.S. PATENT DOCUMENTS 7,447,942 B2 * 11/2008 Chen et al. ................. 714/38.13
2009/0178030 A1 * 7/2009 Golan et al. .................. 717/129
2009/0235233 A1 * 9/2009 Suzuki et al. ................. 717/124

* cited by examiner

*Primary Examiner* — Chun-Kuan Lee
*Assistant Examiner* — Brooke Taylor
(74) *Attorney, Agent, or Firm* — Workman Nydegger

(57) ABSTRACT

Debugging software in systems with architecturally significant processor caches. A method may be practiced in a computing environment. The method includes acts for debugging a software application, wherein the software application is configured to use one or more architecturally significant processor caches coupled to a processor. The method includes beginning execution of the software application. A debugger is run while executing the software application. The software application causes at least one of reads or writes to be made to the cache in an architecturally significant fashion. The reads or writes made to the cache in an architecturally significant fashion are preserved while performing debugging operations that would ordinarily disturb the reads or writes made to the cache in an architecturally significant fashion.

20 Claims, 5 Drawing Sheets

DEBUGGING MECHANISMS IN A CACHE-BASED MEMORY ISOLATION SYSTEM

CROSS-REFERENCE TO RELATED APPLICATIONS

This application claims the benefit of U.S. Provisional application 61/286,755, filed Dec. 15, 2009, titled "DEBUGGING MECHANISMS IN A CACHE-BASED MEMORY ISOLATION SYSTEM", which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

From a software perspective, computer processor caches have traditionally been architecturally neutral, providing a performance boost to program execution while not affecting the semantics of the computation. As novel ways are introduced to leverage processor caches to deliver new functionality, such as explicitly buffered or monitored memory accesses to support transactional memory, caches become architecturally visible to programmers.

Software debuggers and profilers attempt to provide a view onto executing applications and system code without perturbing the running code. Many techniques are employed to mitigate and sometimes eliminate the classic observer effect. When trying to hide their presence from code under analysis, debuggers and profilers have traditionally been oblivious to their effect on processor caches, as the caches were not architecturally significant to software and so any perturbation to the cache contents would be immaterial to the code under analysis, except for a marginal performance impact.

However, with caches becoming significant to software, debuggers and profilers can no longer hide their existence from software under analysis. The inherent perturbation to the caches that a debugger or profiler causes can directly impact the execution paths taken by the software under analysis.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method practiced in a computing environment. The method includes acts for debugging a software application, wherein the software application is configured to use one or more architecturally significant processor caches coupled to a processor. The method includes beginning execution of the software application. A debugger is run while executing the software application. The software application causes at least one of reads or writes to be made to the cache in an architecturally significant fashion. The reads or writes made to the cache in an architecturally significant fashion are preserved while performing debugging operations that would ordinarily disturb the reads or writes made to the cache in an architecturally significant fashion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein may use software simulation to overcome the limitations of architecturally significant processor caches. Alternatively and/or additionally embodiments may use extensions to a microprocessor hardware architecture to deliver an integrated software/hardware debugging environment instead of a pure software environment. Alternatively and/or additionally, mechanisms may be used for debuggers and profilers to continue hiding their existence from software under analysis even while running on a microprocessor with architecturally significant caches.

As noted, modern systems may implement architecturally significant processor caches. One such example is in the implementation of hardware based transaction management. While other architecturally significant processor cache embodiments may be implemented, examples of hardware based transaction management can be used to illustrate the significance.

Figure 1A:
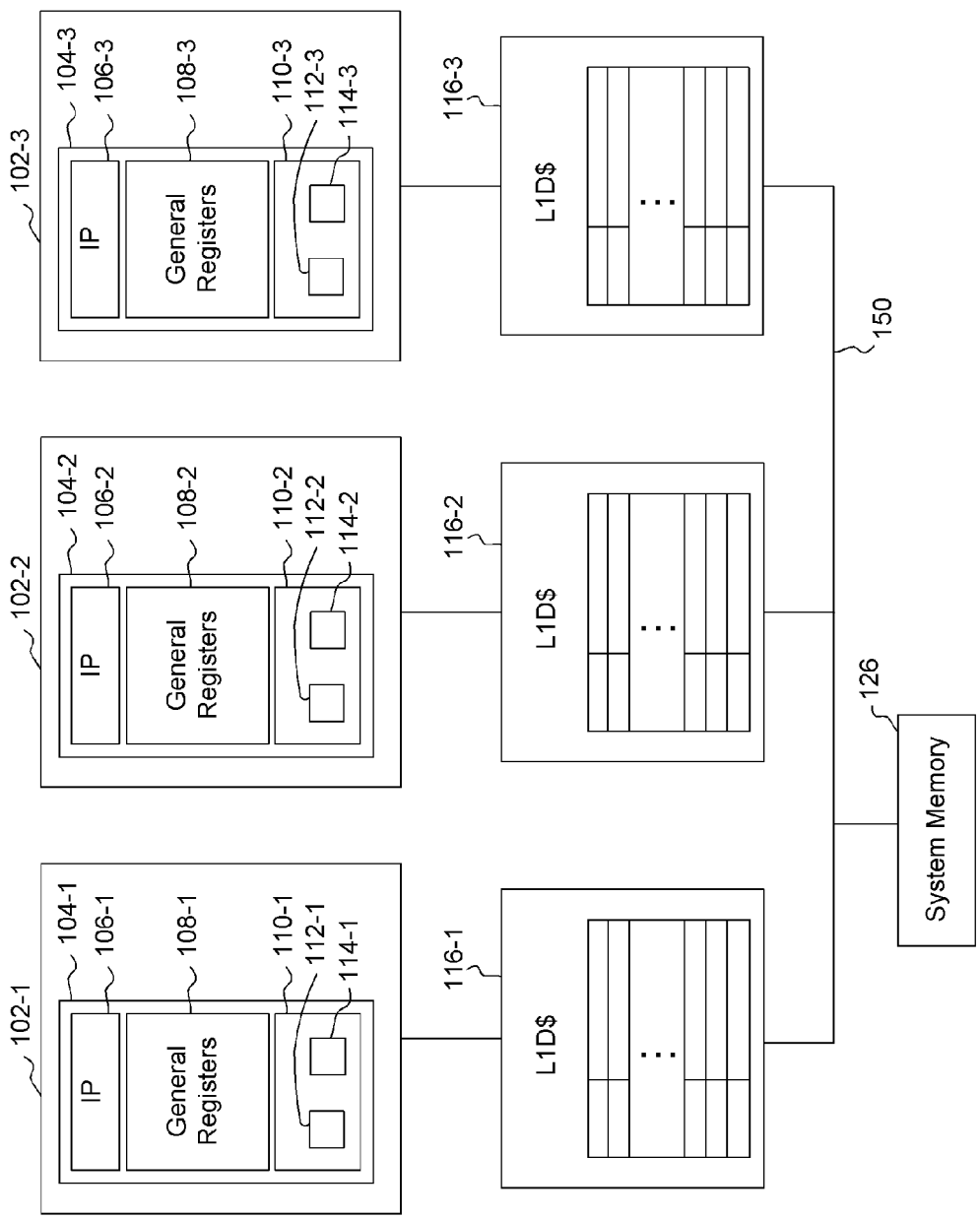
FIG. 1A illustrates a cache hierarchy.

Hardware transactional memory solutions may be implemented using cache memory. Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-

1-102-3 supports a single thread 104-1-104-3 respectively. However, embodiments may be implemented where processors support multiple threads. Each of the threads 104-1-104-3 includes an instruction pointer 106-1-106-3, general registers 108-1-108-3, and special registers 110-1-110-3. Each of the special registers 110-1-110-3 includes a transaction control register (TCR) 114-1-114-3 and a transaction status register (TSR) 112-1-112-3. The functionality of these registers will be explained in more detail below in conjunction with the description of FIG. 1B.

Figure 1B:
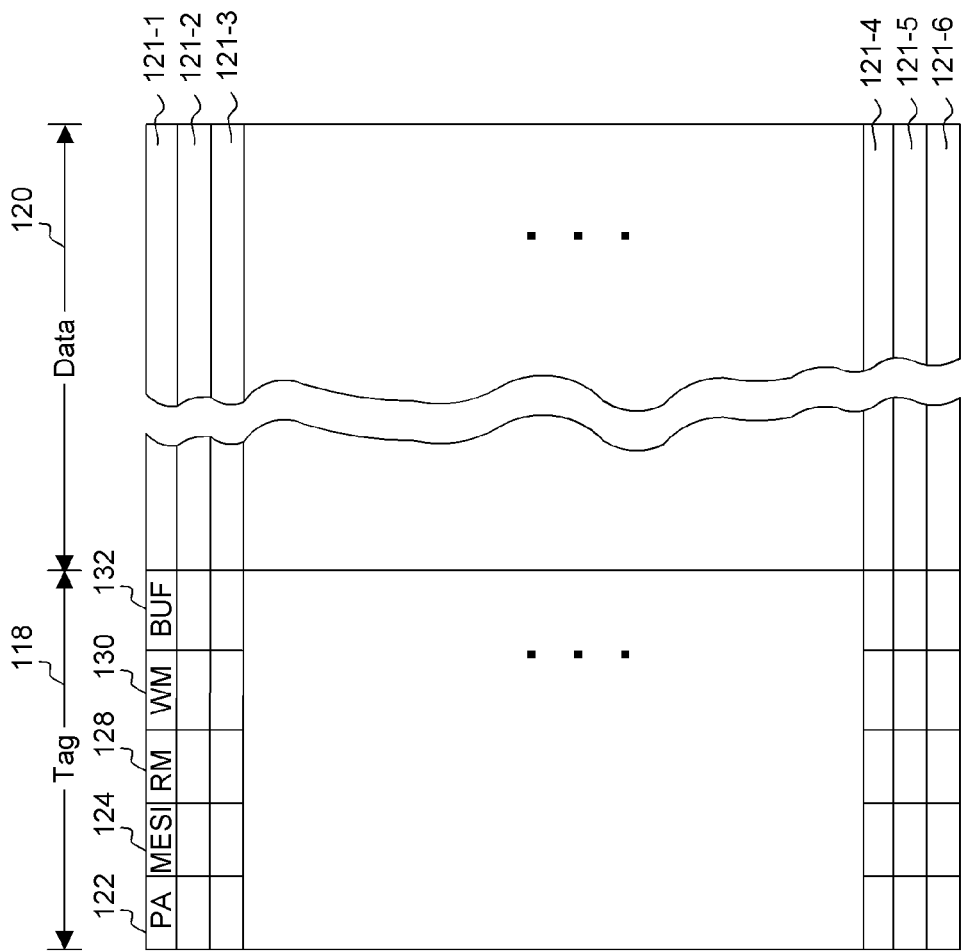
FIG. 1B illustrates details of a data cache with monitoring enabled.
Figure 1B:
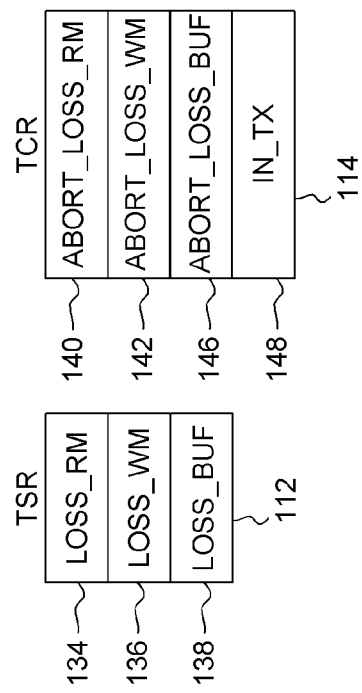

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120. The tag column 118 typically includes an address column 122 and a MESI column 124. The MESI indicator is used for implementing the Illinois MESI protocol and indicates a state of data in a cache line. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location and no other agents have a cached copy of the data. If the indicator indicates that data is exclusive, this means that no other agents have a cached copy of the data. If the indicator indicates that the data is shared, this means that other agents may share the same version of the data. If the data is indicated as invalid, then the data at the current location is invalid and will not be used.

In a cache-coherent multiprocessor, a level of data cache that is logically private to one processor (usually level one data cache (L1D$)) may be extended with additional MESI states and behavior to provide cache coherence based detection of conflicting data accesses from other agents, and to locally buffer speculative writes in a private cache such that other agents in the system do not observe speculatively written data until the data's state transitions from speculatively written to globally observed.

The address column 122 includes a physical address for data stored in the data column 120. In particular, as illustrated in FIG. 1A, a computing system generally includes system memory 126. The system memory may be, for example semiconductor based memory, one or more hard-drives and/or flash drives. The system memory 126 has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, for implementing architecturally significant processor caches that allow for hardware transactions to be performed, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture.

FIG. 1B further illustrates details of the transaction status register 112 included in the hardware threads 104. The transaction status register 112 accumulates events related to the read monitor indicator, the write-monitor indicator, and the buffer monitor indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

Thus, as illustrated in this one particular example, software can make use of specially purposed processor caches, such as those shown in FIGS. 1A and 1B, in unique ways. Additionally, software compilers can be implemented which make use of the specially purposed processor caches. However, running a debugger or monitor may, in its ordinary course of cache usage, interfere with cache lines 121 used by the software under test. In a worst case scenario, it may cause an application to switch to a completely software mode which does not use architecturally significant processor caches, such that execution of the program using architecturally significant processor cache features of a cache may not be able to be tested using the debugger or monitor.

One embodiment can be used to facilitate application testing that nonetheless allows the application to use architecturally significant processor cache features of a cache by combining hardware and simulation-based debugging. In particular, and with reference to FIG. 2, embodiments may be implemented that run any sequences of code that depend on architecturally significant processor cache features, such as cache isolation semantics, in a software simulator 202. The software simulator 202 may be a virtual machine that models how the processor 102 and cache 116 function. When debugging an application running on physical hardware such as the processor 102 and cache 116, code sequences which involve leveraging architecturally significant processor cache features, such as cache isolation semantics, such as a memory transaction, the debugging environment automatically redirects execution of the application to a software simulator 202 which includes a simulated processor 102' and a simulated cache 116'. The simulator 202 can readily execute the application code and faithfully simulate cache semantics. When the particular code block completes, the simulator 202 exits and the application continues to execute normally. The simulator 202 may be a software application including software modules that can be executed by one or more processors.

When debugging functionality is desired, the debugger will typically send an interrupt to the processor 102. This will cause the processor 102 to stop executing instructions for the application under test. In particular, an operating system may work with the debugger to determine when processor 102 and cache 116 activities should be simulated using the simulator 202, including the simulated processor 102' and cache 116', as opposed to stepping instructions through using the actual processor 102 and cache 116. Specifically, the operating system may cause any operations that use the architecturally significant portions of architecturally significant processor caches to be simulated using the simulator 202.

Embodiments may be implemented where a snapshot of the processor state, e.g. the state of registers in the processor 102 and/or the state of system memory are provided to the simulator 202 where this state is applied to the simulated processor 102'. Typically, the cache 116 data is not provided to the simulator, which can result in some loss of fidelity, but is nonetheless effective for the simulation. Instructions can then be stepped through the simulated processor 102' and simulated cache 116' until no longer appropriate to do so. For example, if the architecturally significant processor caches are used for hardware based transactions, committing or aborting the transaction may signal that simulation is no longer appropriate, needed or desirable. The state of the virtual processor 102' can be returned and applied to the actual processor 102 and/or used for other debugging analysis.

Embodiments may be implemented to specifically not use the simulator when no architecturally significant artifacts remain in the architecturally significant caches. For example, when no buffered reads or writes are stored in the cache as indicated by hardware indicated buffering, the simulator does not need to be used, but rather other debugging techniques may be used.

Additionally or alternatively, processor designs may be implemented to enable more effective simulation. A processor design may be extended to support the ability to spill the contents of its caches, including any metadata, to physical memory. This may be done by simply committing data cached in architecturally significant processor caches to main memory using the MESI protocol and related tools. For example, with reference to FIG. 1B, information in any of the caches 116 can be migrated to the system memory 126. The migrated information includes metadata such as the metadata in columns 122, 124, 128, 130 and 132. This enables a software simulator to initialize itself to a state which is consistent with that of the physical processor, which can enable more accurate simulation.

Additionally or alternatively embodiments may implement architecturally significant processor cache data breakpoints. Traditionally, hardware breakpoints have been used to monitor addresses for instructions or data. For example, a processor may have a number of registers that allow addresses, for either instructions or data, to be set. When an attempt is made to access an instruction or data at these addresses, the processor will halt execution of an application and allow debugging operations to take place, such as stepping through the application one instruction at a time.

Some embodiments extend traditional breakpoints to function with architecturally significant processor caches. These extensions to the traditional data breakpoint of modern processor respond to, for example, changes in the isolation state of individual memory locations. Specifically, a programming or debugging tool can set specialized registers in the processor 102 which causes the processor 102 to start tracking state transitions associated with specific memory locations. When these transitions occur during program execution, the processor automatically raises an exception which activates a debugger. This makes it possible for the programmer to glean insights as to the behavior of the software in order to identify defects or performance bottlenecks. Embodiments may be implemented where the set of state transitions that can be tracked include any Boolean attribute associated with a memory location. Examples of such Boolean attributes include monitoring and buffering as illustrated above in FIGS. 1A and 1B. Transitions can be tracked from 0 to 1, or 1 to 0, as desired.

Notably, while embodiments may be used to track attributes associated with cache isolation semantics, the same functionality may be extended to support additional forms of metadata that can be applied to memory within a computer system. For example, embodiments may be implemented such that any transition of any memory location which includes metadata (such as the RM 128, WM 130, and BUF 132 columns) will result in an exception being raised which activates the debugger.

Additionally or alternatively embodiments may implement debug exceptions for loss of isolation. In particular, a processor may include a feature which allows a programmer to specify that the processor should trigger an exception when loss of isolation has occurred. For example, loss of isolation may be indicated by the events accumulated in the transaction status register 112, such as loss of read monitoring 134, loss of write monitoring 136 or loss of buffering 138. In some embodiments, the exception carries information which indicates the cause of the loss of isolation. For example, isolation may be loss due to: to a conflicting access to an isolated memory location performed by another processor; to the software exceeding the isolation capacity of the processor, and/or to the software performing operations not allowed while operating in cache isolation mode. Inducing an exception when these events occur provides insights to a programmer to enable debugging and performance tuning.

The following illustrate a number of debug exceptions that may be implemented for monitoring loss in memory isolated hardware. In some of the examples illustrated, specific names of debug exceptions are called out, but it should be appreciated that other names may be used. These examples are simply to show functionality of the debug exceptions.

To allow the discovery of performance bottlenecks, the hardware provides the following mechanisms to discover loss of monitoring:

IA32_DEBUGMSR.STOP_ON_CONFLICT. This mechanism causes a debug exception (#DB) to be invoked whenever a loss of read monitor, loss of write monitor, or loss of buffering occurs. For example, with reference to FIG. 1B, this may occur when TSR.LOSS_* bits 134, 136, and/or 138 transition from 0 to 1 as a result of a monitoring conflict. In some embodiments, the #DB may be deferred until the processor executes a data memory access.

IA32_DEBUGMSR.STOP_ON_RESOURCE_LACK. This mechanism causes a #DB to be invoked whenever a loss of read monitor, loss of write monitor, or loss of buffering occurs (e.g. with reference to FIG. 1B, when TSR.LOSS_* bits transition from 0 to 1) as a result of lack of resources.

IA32_DEBUGMSR.STOP_ON_EJECTION. This mechanism causes a #DB to be invoked whenever ejection takes place within a hardware transaction.

Embodiments may be implemented where lack of resource exceptions are synchronous to program execution, making it possible to discover why transactions are overflowing the hardware resources. Embodiments may be implemented where conflict exceptions are asynchronous to program execution, so they cannot directly make it possible to find the cause of a conflict. Ejection exceptions make it possible to capture non-linear control transfer.

Embodiments may be implemented that include transactional breakpoints. In particular, to enable sophisticated low-intrusion performance tuning, the hardware may invoke the debugger on significant transactional events. For example, embodiments may include a mechanism to trigger a debug exception for any successful commit and/or a mechanism to trigger a debug exception for any unsuccessful commit.

The debug exceptions described above may allow a thread to run and later signal an unbounded transactional memory (UTM) event without having to recompile the code under test.

Additionally or alternatively embodiments may include cache freeze on exceptions. In particular, in some embodiments, a microprocessor architecture is extended to support the ability to automatically freeze the contents of one or more processor caches 116 when an exception occurs. For example, the processor 102 may include a register or flag that can be set, and when set, the contents of the processor caches 116 are frozen when an exception occurs. In particular, freezing the cache may result in the processor 102 essentially halting use of all or portions of the cache 116. This protects the data in the cache 116 from being overwritten by subsequent operations. The contents of the cache 116 can then be inspected by a debugger or other agent. When this mode is enabled, it makes it possible to debug software running on the particular processor without disturbing the contents of the processor caches 116.

Figure 3:
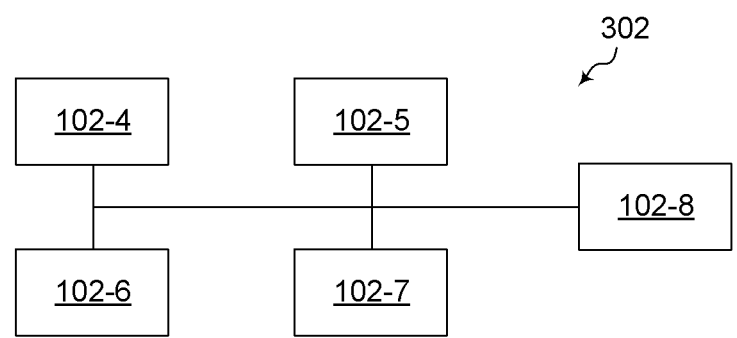
FIG. 3 illustrates an example multi-core system.

Additionally or alternatively embodiments may include core isolation. In particular, in some embodiments, the operating system scheduler is extended to allow threads being debugged to gain near exclusive access to a particular processor such that no other user mode software and very little kernel mode software runs on that processor. FIG. 3 illustrates an example of a system 302 that includes multiple cores illustrated as processors 102-4, 102-5, 102-6, and 102-7. Note that as used herein the term processor and core may be used interchangeably. A chip package or die does not necessarily include only a single core or processor. Thus embodiments may be whereby the operating system scheduler is extended to allow threads being debugged to gain near exclusive access to a particular processor, such as processor 102-4. When an exception is raised by the thread that is undergoing debugging, the operating system notifies another processor, such as processor 102-5, of the exception and quickly enters an idle loop where it awaits commands from other processors. The work that the operating system does on the subject processor, 102-4 in this example, is kept to a strict minimum in order to avoid disturbing the cache, which holds application-level data.

Additionally or alternatively embodiments may include core freezing and cross-core scan chain access. In particular, a microprocessor chip architecture that includes multiple processors may be extended with three mechanisms: 1) when an exception occurs on a core, such as processor 102-4, the core's state is automatically frozen and execution stops completely; 2) when a core is frozen, an interrupt is dispatched to another core, such as processor 102-5, informing it of the first core's situation; and 3) the second core (e.g. processor 102-5) can reach over and interrogate the first core using scan chains so that it is possible to manually read and write the cache contents of the first core. Scan chains are a tool whereby processor state, such as the state of registers in the processor can be serially, (or in a parallel fashion) output from a specialized interface of the processor. In particular, the core may include a hardware serial interface that can be used to interrogate the state of the core. The interface can be used to interrogate all state or some particular state. The desired state is serialized and output to the hardware serial interface. As an example, a JTAG scan chain interface may be used. The embodiment above may be implemented, in some versions of the embodiments, where the multi-core system is implemented by having the multiple processors on the same semiconductor die, or at least packed in the same integrated circuit package. Further, while the embodiment illustrated in FIG. 3 illustrate that a general purpose processor 102-5 can be used to interrogate another general purpose processor 102-4 with frozen state, it should be appreciated that a special purpose processor, such as processor 102-8, may be implemented. The special purpose processor 102-8 may be utilized only for scan chain purposes.

Notably, embodiments implementing cross-core scan chain access may be used in environments not merely dealing with cache effects. Embodiments could be used as a general-purpose debugging solution. In particular, while previous utilization of scan chains have required specialized external hardware to interrogate a processors state, embodiments may be implemented whereby in-package or on die processors are extended with scan chain interrogation and/or reading functionality. In particular one core on a die or in a chip package may be able to interrogate another core's state by accessing the other core's scan chain hardware interface.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. Further, it should be understood that the methods may be practiced by a computer system including one or more processors and computer readable media such as computer memory. In particular, the computer memory may store computer executable instructions that when executed by one or more processors cause various functions to be performed, such as the acts recited in the embodiments.

Figure 4:
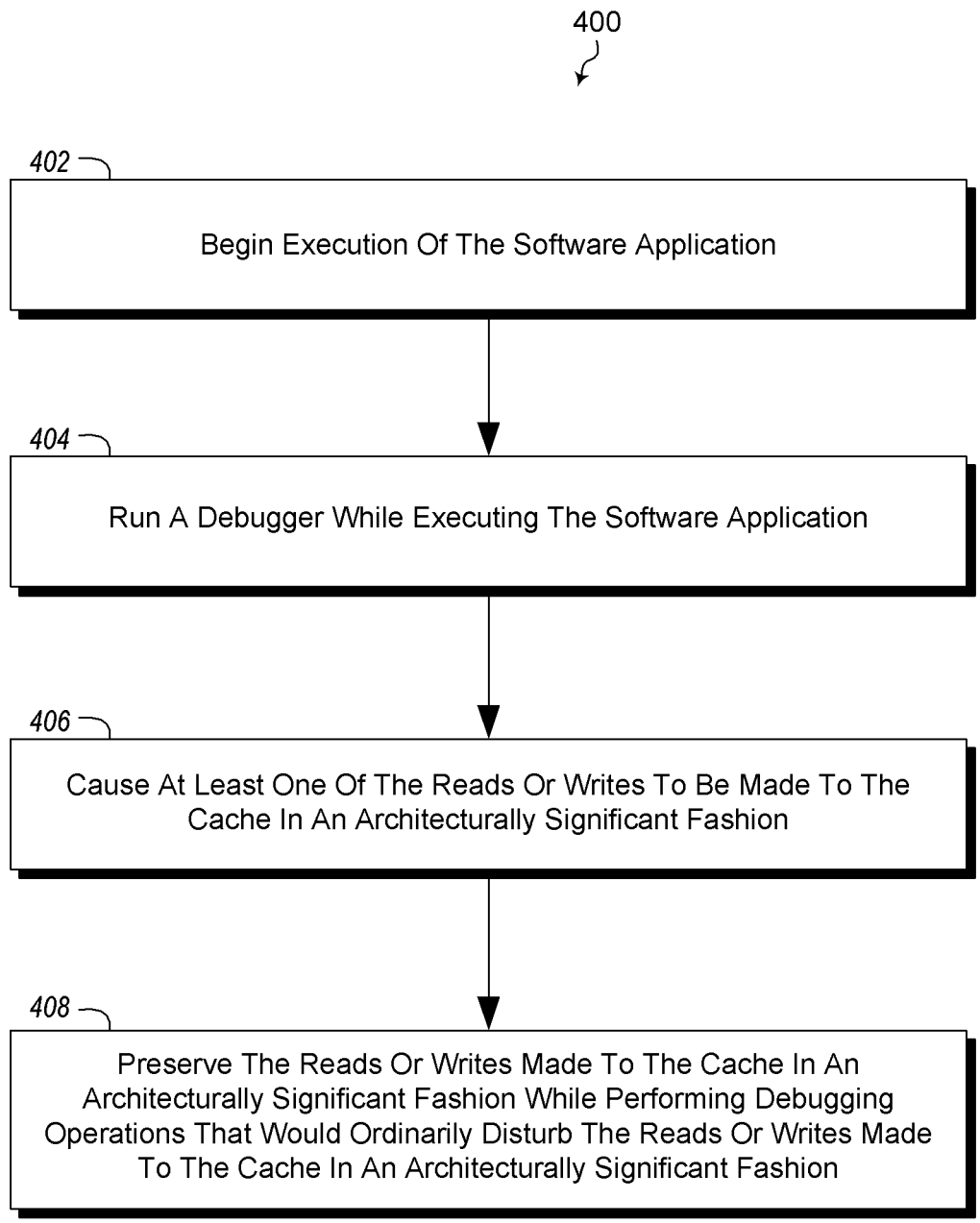
FIG. 4 illustrates a method of writing to a card table.

Referring now to FIG. 4, a method 400 is illustrated. The method 400 may be practiced in a computing environment and includes acts for debugging a software application when the software application is configured to use one or more architecturally significant processor caches coupled to a processor. The method 400 includes beginning execution of the software application (act 402). The method 400 further includes running a debugger while executing the software application (act 404). The software application causes at least one of reads or writes to be made to the cache in an architecturally significant fashion (act 406). For example, as described above, causing at least one of reads or writes to be made to the cache in an architecturally significant fashion may include performing at least one of buffered or monitored reads or writes to the cache. The method 400 further includes preserving the reads or writes made to the cache in an architecturally significant fashion while performing debugging operations that would ordinarily disturb the reads or writes made to the cache in an architecturally significant fashion.

Figure 2:
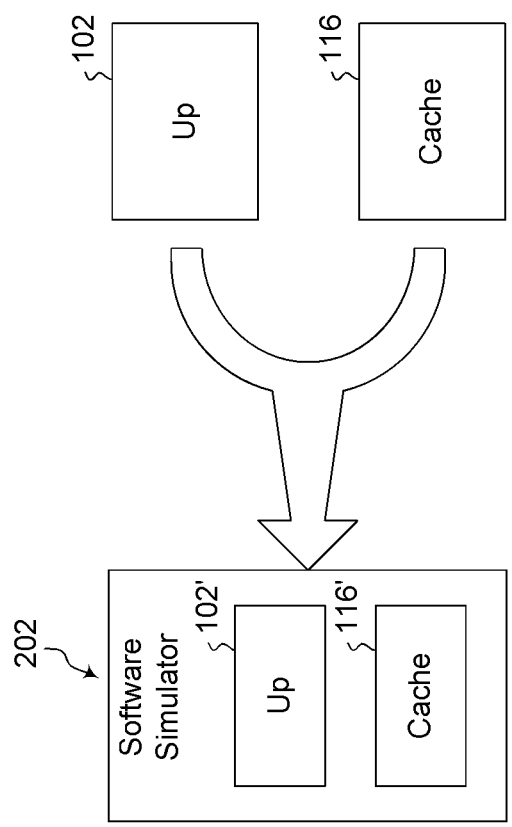
FIG. 2 illustrates a system simulator simulating a processor and architecturally significant cache.

Preserving the reads or writes made to the cache in an architecturally significant fashion may include one or more of: simulating the processor and the one or more architecturally significant processor caches using a software simulator, as illustrated in FIG. 2 above; spilling contents of caches, including metadata to physical memory; implementing architecturally significant processor cache, such as isolation aware, data breakpoints; implementing debug exceptions for loss of isolation; performing a cache freeze on exceptions; isolating a core from other cores in a multi-core system; freezing a core in a multi-core system; or performing cross-core scan chain access of a core.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of debugging a software application, wherein the software application is configured to use one or more processor caches coupled to a processor in an architecturally significant fashion, the method comprising:

beginning execution of the software application at a physical processor;

running a debugger while executing the software application at the physical processor;

detecting that a portion of the software application causes at least one of reads or writes to be made to a processor cache in an architecturally significant fashion; and based on detecting that the portion of the software application causes at least one of reads or writes to be made to the processor cache in an architecturally significant fashion, preserving any reads or writes made to the cache in an architecturally significant fashion, while performing debugging operations with the debugger that would ordinarily disturb the reads or writes made to the processor cache in an architecturally significant fashion, including:

taking a snapshot of physical processor state of the physical processor and pausing execution of the software application at the physical processor;

executing the portion of the software application using a software simulator that simulates the physical processor using the snapshot of physical processor state and that simulates the processor cache, while also performing the debugging operations with the debugger; and subsequent to executing the portion of the software application using the software simulator:

applying simulated processor state to the physical processor; and resuming execution of the software application at the physical processor.

2. The method of claim 1, wherein the portion of the software application causing at least one of reads or writes to be made to the processor cache in an architecturally significant fashion comprises the portion of the software application performing at least one of buffered write or monitored reads or writes to the processor cache.

3. The method of claim 1, further comprising not using the software simulator when no architecturally significant artifacts remain in the processor cache.

4. The method of claim 1, wherein preserving any reads or writes made to the processor cache in an architecturally significant fashion comprises spilling contents of the processor cache, including metadata, to physical memory for use with simulating the processor cache.

5. The method of claim 1, wherein preserving any reads or writes made to the processor cache in an architecturally significant fashion comprises implementing architecturally significant processor cache data breakpoints.

6. The method of claim 1, wherein preserving any reads or writes made to the processor cache in an architecturally significant fashion comprises implementing debug exceptions for loss of isolation.

7. The method of claim 1, wherein performing debugging operations that avoid disturbing the reads or writes made to the processor cache in an architecturally significant fashion comprises performing a cache freeze on exceptions.

8. The method of claim 1, wherein performing debugging operations that avoid disturbing the reads or writes made to the processor cache in an architecturally significant fashion comprises isolating a processor core from other processor cores in a multi-core system.

9. The method of claim 1, wherein performing debugging operations that avoid disturbing the reads or writes made to the processor cache in an architecturally significant fashion comprises freezing a processor core in a multi-core system.

10. The method of claim 1, wherein performing debugging operations with the debugger that avoid disturbing the reads or writes made to the processor cache in an architecturally significant fashion comprises performing cross-core scan chain access of a processor core.

11. In a computing environment, one or more physical computer-readable storage devices comprising computer executable instructions that when executed by one or more processors cause the one or more processors to perform the following:

beginning execution of a software application at one or more physical processors;

running a debugger while executing the software application at the one or more physical processors;

detecting that a portion of the software application causes at least one of reads or writes to be made to a processor cache in an architecturally significant fashion; and based on detecting that the portion of the software application causes at least one of reads or writes to be made to the processor cache in an architecturally significant fashion, preserving any reads or writes made to the processor cache in an architecturally significant fashion while performing debugging operations with the debugger that would ordinarily disturb the reads or writes made to the processor cache in an architecturally significant fashion, including:

taking a snapshot of physical processor state of at least one of the physical processors and pausing execution of the software application at the at least one of the physical processors;

executing the portion of the software application using a software simulator that simulates at least one of the physical processors using the snapshot of physical processor state and that simulates the processor cache, while also performing the debugging operations with the debugger; and subsequent to executing the portion of the software application using the software simulator:

applying simulated processor state to the at least one of the physical processors; and resuming execution of the software application at the least one of the physical processors physical processor.

12. The physical computer-readable storage devices of claim 11, wherein the portion of the software application causing at least one of reads or writes to be made to the processor cache in an architecturally significant fashion comprises the portion of the software application performing at least one of buffered or monitored writes or stores to the processor cache.

13. The physical computer-readable storage devices of claim 11, wherein preserving any reads or writes made to the processor cache in an architecturally significant fashion comprises spilling contents of the processor cache, including metadata, to physical memory for use with simulating the processor cache.

14. The physical computer-readable storage devices of claim 11, wherein preserving any reads or writes made to the processor cache in an architecturally significant fashion comprises implementing architecturally significant processor cache data breakpoints.

15. The physical computer-readable storage devices of claim 11, wherein preserving any reads or writes made to the processor cache in an architecturally significant fashion comprises implementing debug exceptions for loss of isolation.

16. The physical computer-readable storage devices of claim 11, wherein performing debugging operations that avoid disturbing the reads or writes made to the processor cache in an architecturally significant fashion comprises performing a cache freeze on exceptions.

17. A computer system, comprising:

a physical processor;

a processor cache;

system memory; and one or more computer-readable media storing computer executable instructions that, when executed, cause the computer system to perform the following:

beginning execution of a software application at the physical processor;

running a debugger while executing the software application at the physical processor;

detecting that a portion of the software application causes at least one of reads or writes to be made to the processor cache in an architecturally significant fashion; and based on detecting that the portion of the software application causes at least one of reads or writes to be made to the processor cache in an architecturally significant fashion, preserving any reads or writes made to the cache in an architecturally significant fashion, while performing debugging operations with the debugger that would ordinarily disturb the reads or writes made to the processor cache in an architecturally significant fashion, including:

taking a snapshot of physical processor state of the physical processor and pausing execution of the software application at the physical processor;

executing the portion of the software application using a software simulator that simulates the physical processor using the snapshot of physical processor state and that simulates the processor cache, while also performing the debugging operations with the debugger; and subsequent to executing the portion of the software application using the software simulator:

applying simulated processor state to the physical processor; and resuming execution of the software application at the physical processor.

18. The method of claim 4, further comprising copying a portion of physical memory to the processor cache subsequent to executing the portion of the software application using a software simulator.

19. The method of claim 1, wherein the software simulator simulates a plurality of physical processors and a plurality of processor caches.

20. The method of claim 1, wherein taking a snapshot of physical processor state of the physical processor comprises taking a snapshot of the processor cache.

* * * * *